United States Patent
Lytkin et al.

(10) Patent No.: US 9,959,353 B2
(45) Date of Patent: May 1, 2018

(54) DETERMINING A COMPANY RANK UTILIZING ON-LINE SOCIAL NETWORK DATA

(71) Applicant: Microsoft Technology Licensing, LLC, Redmond, WA (US)

(72) Inventors: Nikita Igorevych Lytkin, Sunnyvale, CA (US); Navneet Kapur, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 312 days.

(21) Appl. No.: 14/698,730

(22) Filed: Apr. 28, 2015

(65) Prior Publication Data

US 2016/0321362 A1    Nov. 3, 2016

(51) Int. Cl.
*G06F 17/30* (2006.01)
*G06Q 50/00* (2012.01)

(52) U.S. Cl.
CPC .... *G06F 17/30867* (2013.01); *G06F 17/3053* (2013.01); *G06F 17/30958* (2013.01); *G06Q 50/01* (2013.01)

(58) Field of Classification Search
CPC ........... G06F 17/3053; G06F 17/30598; G06F 17/30867; G06F 17/30864
USPC ........................................................ 707/723
See application file for complete search history.

(56) References Cited

U.S. PATENT DOCUMENTS

| | | |
|---|---|---|
| 2002/0035506 A1 | 3/2002 | Loya et al. |
| 2011/0276507 A1 | 11/2011 | O'Malley |
| 2013/0024412 A1 | 1/2013 | Gong et al. |
| 2013/0159291 A1 | 6/2013 | Ieong et al. |
| 2014/0081928 A1 | 3/2014 | Skomoroch et al. |
| 2014/0214945 A1 | 7/2014 | Zhang et al. |
| 2014/0244612 A1 | 8/2014 | Bhasin et al. |

(Continued)

FOREIGN PATENT DOCUMENTS

| | | |
|---|---|---|
| CN | 106156136 A | 11/2016 |
| IN | 900DEL2015 A | 4/2016 |
| WO | WO-2016048410 A1 | 3/2016 |

OTHER PUBLICATIONS

"International Application Serial No. PCT/US2015/020818, International Search Report dated Jul. 1, 2015", 2 pgs.

(Continued)

*Primary Examiner* — Shahid Alam

(74) *Attorney, Agent, or Firm* — Schwegman Lundberg & Woessner, P.A.

(57) ABSTRACT

Method and system to determine a company rank utilizing on-line social network data are described. A company ranking system is configured to access a base set of member profiles, construct a talent flow graph having nodes that represent respective companies and edges that represent transitions of employees from one company to another, and determine a node score for each node by applying a ranking algorithm to the graph. In one embodiment, a company ranking system generates perturbed versions of the base set by using bootstrap resampling procedure and uses the perturbed versions of the base set to calculate ranking data for the nodes in the talent flow graph in the form of node scores. The distribution of the node scores included in the ranking data calculated for a given node is used to determine a desirability score for the company represented by the node.

18 Claims, 5 Drawing Sheets

(56) References Cited

U.S. PATENT DOCUMENTS

2016/0019465 A1    1/2016    Milton et al.
2016/0086195 A1    3/2016    Gordon et al.

OTHER PUBLICATIONS

"International Application Serial No. PCT/US2015/020818, Written Opinion dated Jul. 1, 2015", 7 pgs.

U.S. Appl. No. 14/494,402, filed Sep. 23, 2014, Determine a Company Rank Utilizing On-Line Social Network Data.

"U.S. Appl. No. 14/494,402, Non Final Office Action dated Jul. 6, 2017", 23 pgs.

"International Application Serial No. PCT/US2015/020818, International Preliminary Report on Patentability dated Apr. 6, 2017", 6 pgs.

"U.S. Appl. No. 14/494,402, Final Office Action dated Nov. 1, 2017", 29 pgs.

"U.S. Appl. No. 14/494,402, Response filed Oct. 5, 2017 to Non Final Office Action dated Jul. 6, 2017", 13 pgs.

DETERMINING A COMPANY RANK UTILIZING ON-LINE SOCIAL NETWORK DATA

TECHNICAL FIELD

This application relates to the technical fields of software and/or hardware technology and, in one example embodiment, to system and method to determine a desirability score for a company utilizing on-line social network data.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be include one or more web pages, or a structured representation of the member's information in XML (Extensible Markup Language), JSON (JavaScript Object Notation), etc. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
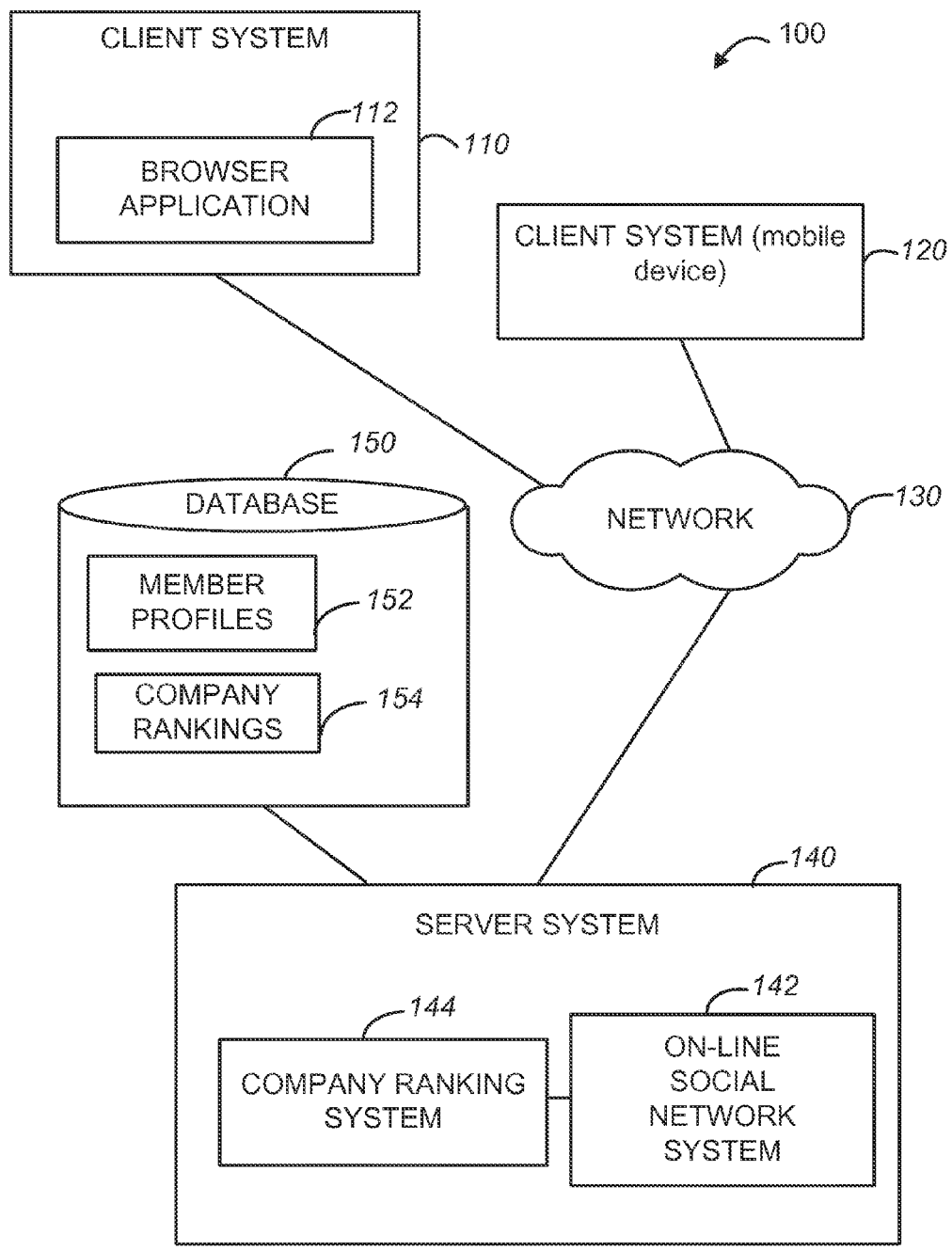
FIG. 1 is a diagrammatic representation of a network environment within which an example method and system to determine a desirability score for a company utilizing on-line social network data may be implemented.

A method and system to determine a preferred list length for school ranking is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies.

Information that can be obtained from member profiles, such as, e.g., the patterns of transitions between companies by members pursuing employment in a given professional role, may be utilized beneficially to determine how desirable is any particular company as compared to other companies with respect to that professional role or occupation. In an on-line social network companies may be represented by items in an electronically-stored set (a set of companies), where each item is identified by at least a company identification. Desirability of a company may be expressed as a desirability score, also referred to as a company ranking. In one embodiment, a determination of company ranks may be made utilizing so-called inflows and outflows of people with respect to companies that are being ranked. Companies that tend to attract people, e.g., those companies to which people tend to transition from other companies, are identified as higher ranking companies, as opposed to those companies, to which none or fewer people tend to transition from other companies, which are identified as lower ranking companies. The ranking of companies may be performed with respect to a particular occupation, such as, e.g., sales, finance, computer engineering, etc. Thus, a dataset selected as underlying data for determining of inflows and outflows of people with respect to companies that are being ranked may be a base set of member profiles selected according to a particular occupation. For example, in order to determine desirability of companies with respect to employment as a software engineer, the selected dataset may include only those profiles that have been identified as representing members who have held a job as a software engineer.

In order to generate respective rankings or scores for a set of companies, a computer-implemented company ranking system may be configured to examine member profiles representing respective members of the on-line social network system and extract so-called transition data. An item in the transition data indicates transition, of a member of the on-line social network system, from one company to another company. A company ranking system may access a member profile, determine, from the employment section of the profile, that a person represented by the member profile left company A and joined company B, and increment a count of employees who transitioned from company A to company B. This process of extracting transition data may continue until all profiles from the dataset comprising member profiles associated with a certain occupation in the social network system have been examined. Thus extracted transition data may be then used to determine ranking values for companies that indicate their respective desirability to people interested in obtaining positions with respect to the subject occupation. For example, a company ranking system may use members' work histories obtained from respective member profiles to construct a graph reflecting flow of talent between companies as well as retention within companies, which may be referred to as a talent flow graph.

Nodes in the talent flow graph correspond to companies and may thus be referred to as company nodes. Edges in the graph are directed and weighted by the number of members who have made a transition from one company to the other. An edge in a talent flow graph has a direction from one node (e.g., node A representing company A) to another node (e.g., node B representing company B), if transition data indicates that more employees moved from company A to company B than from company B to company A. For example, if there are nine people that left company A to work for company B and one person that left company B to work for company A, the edge from node A to node B would be assigned a weight of 90%, which represents that 90% of the people who are moving between these two companies A and B are moving from company A to company B. In another embodiment, a weight assigned to an edge connecting a first node and a second node is based on the number of employees that transitioned from the first company to the second company and/or the number of employees transitioned from the second company to the first company. For example, if 10 people moved from company A represented by node A to company B represented by node B and 15 people moved from company B to company A, the directed edge from node A to node B would be given a weight of 10 and the edge from node B to node A would be given a weight of 15. In one embodiment, the edges in a company talent flow graph are created only between nodes that represent companies that have a so-called employee transition relationship. For example, if no employees moved from company A to company B or from company B to company A during the target period, there would not be an edge connecting A and B in the company talent flow graph.

A node score for each node of the talent flow graph may be determined by applying a ranking algorithm to the graph, such as, for example, PageRank algorithm. A node score for a node in the talent flow graph indicates a likelihood that a member of the on-line network system transitions to a company represented by that node. A node score can be a value between 0 and 1 and the sum of all node scores in a talent flow graph equals to 1. The node score of a node is indicative of a projected size of a company represented by the node at a future time, provided that the same transitioning trend of employees continues. In one embodiment, a company ranking system may calculate a projected size value for each node in the talent flow graph. A projected size value for a node may be determined by multiplying the node score of the node by the number of member profiles that have been examined in order to construct the talent flow graph. For example, if the number of all member profiles that are being considered in constructing the talent flow graph is 30M and the node score for node A representing company A is one percent, the projected size of company A would be 1% of 30M, which is 3M.

In some embodiments, various scores generated for a node in the talent flow graph may include, e.g., the difference between the current size and the projected size of a company represented by the node, the ratio of the current size and the projected size of the company, a value that indicates the ratio or the difference between the current size and the projected size of the company as compared to companies represented by other nodes in the talent flow graph. The score generated for a node in the talent flow graph, a node score, may be used as a desirability score with respect to a company represented by that node.

In one embodiment, a score generated for a node representing a company may be boosted by a value affected by the number of people who remained employed at the company during the target/sample period of time or during a certain predetermined period of time. For example, for every person who remains employed at the company for a year, the rank of the node that represents that company is increased. The number of people staying at the company may be represented by a self-loop type of edge in the transition graph. Weights on self-loop edges can be normalized for median retention within the corresponding set of companies and professional roles. For example, for ranking companies by desirability for software engineers (SWEs), the relevant population of members (the underlying dataset) may be limited to those members who held a SWE role. The talent flow graph will then be formed on the basis of companies these members have worked at in SWE roles. Median retention may be computed specifically in this population and used to normalize weights on retention edges (self-loop edges) of the graph.

Generally, companies with relatively strong retention and rigorous inflow of talent would rank higher than companies that are losing employees and/or for which few employees choose to work. However, the underlying distribution of the number of members contributing to weights of edges touching a company node in the graph may be skewed as a result of a relatively small number of company nodes in the graph having their edge weights determined by a large number of member profiles, and a larger number of company nodes in the graph having their edge weights determined by a relatively small number of member profiles. Such skew could make company rankings sensitive to small changes in the underlying data. For instance, addition of a small number of member profiles into the base set of member profiles may significantly affect the ranking of a company represented by a company node whose edge weights are determined by, e.g., only ten member profiles.

In order to make company rankings robust to potential noise or small changes in the data and to produce statistically sound results, the following methodology was developed based on what's known in statistical community as bootstrap resampling. Given a set of N member profiles (referred to as the base set of member profiles or the original set), bootstrap resampling is achieved by randomly sampling with replacement each one of the N member profiles from the set. The process of random resampling may be performed K times thus yielding K sets of samples $S_1, \ldots, S_K$. A perturbed set of member profiles may be referred to as a sample $S_i$ or merely a sample. Because the sampling is done with replacement, some member profiles from the original set of selected member profiles may appear multiple times in any given sample $S_i$, while other member profiles from the original set may not appear at all in that sample. The samples $S_1, \ldots, S_K$ are then used to calculate, for each company node representing a respective company, a set of K node scores. A set of K node scores for a company node representing a company may be referred to as ranking data. The distribution of the resulting set of K node scores is then used to determine a desirability score for the company represented by the company node. In one embodiment, the desirability score is determined as a percentile (e.g., 2.5%) of the distribution of the node scores of the company node. This, in effect, incorporates a measure of statistical confidence into the company rankings. Company nodes, whose edges depend on contributions from a small number of member profiles and whose Page Rank scores thus carry lower statistical confidence, will have wider distributions of scores. When the percentile used for determining desirability scores is chosen below the median, companies with lower statistical confidence of their node scores will receive stronger downward adjustment in their respective final desirability scores than company nodes whose edges are formed by considering data from a larger number of member profiles. Depending on the percentile chosen, some company nodes will have their final scores equal to zero and, in some embodiments, the corresponding item from the list of companies that are being ranked will be discarded from the list as having insufficient statistical confidence. It will be noted that the samples used for generating respective ranking data for the company nodes may include also the original (unperturbed) base set of member profiles.

In addition to the work history, such as information about the member's current and past employment, each member profile in the original set of member profiles may include additional attributes, such as, e.g., educational background (universities, degrees, graduation years), gender, skills, etc. In some applications (e.g., where company rankings are used to rank universities), it may be desirable to preserve certain properties of the original set of member profiles when performing resampling. For example, it may be desirable to preserve distributions of numbers of members across universities, degrees, graduation years, gender, etc. when resampling. This may be achieved by stratified resampling, where member profiles in the original set are first partitioned into disjoint subsets such that the profiles in the same subset have the same values of the attributes of interest. Resampling is then performed in each subset independently and the resulting samples are pooled together to form a single resulting perturbed set. Such stratified resampling is then performed repeatedly in order to produce multiple samples of the original set, using the procedure outlined above.

Based on their respective desirability scores, a number of top-ranked companies may be designated as the set of desirable companies for a given occupation. Desirability scores may be stored for future use in a database and may be used for various purposes, such as, e.g., estimating salary of an employee of a particular company, determining a degree of success to be attributed to a member based on respective rankings of companies at which the member has been employed, determining a rank of a university based on the percentage of that university's graduates that become employees of the tope-scored companies, etc. Example method and system to determine a desirability score for a company utilizing on-line social network data may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a company ranking system 144 that may be utilized beneficially to determine respective company rankings (also referred to as company scores) for companies represented by items in one or more electronically-stored sets of company identifiers (also referred to as sets of companies). The company ranking system 144 may be configured to utilize the social network 142 to determine rankings (also referred to as company scores) for various companies. The company ranking system 144 examines member profiles representing respective members of the on-line social network system and extracts transition data. As explained above, an item in the transition data indicates transition, of a member of the on-line social network system 142, from one company to another company. The profiles may be selected for examination based on a particular industry. From the transition data, the company ranking system 144 may derive further data such as how many employees transitioned to the company from other companies during a target period of time and also how many employees remained with the company for the entire target period.

The company ranking system 144 may be configured to construct a talent flow graph having nodes that represent respective companies and edges that represent transitions of employees from one company to another and determine a node score for each node of the talent flow graph, e.g., by applying PageRank algorithm to the graph. The score generated for a node in the talent flow graph, a node score, may be used as a desirability score with respect to a company represented by that node. As explained above, in order to make company rankings robust to potential noise or small changes in the data and to produce statistically sound results, the company ranking system 144 may use the base set of member profiles to generate a number of sample sets using bootstrap resampling procedure. The company ranking system 144 then uses the samples to calculate ranking data for each company node representing a respective company in the form of a set of node scores. The distribution of the resulting set of node scores is then used to determine a desirability score for the company represented by the company node. The company ranking system 144 may also be configured to preserve certain properties of the base set of member profiles when performing resampling, e.g., by stratified resampling described in more detail above. Respective desirability scores for companies in a set of subject companies may be stored for future use in the database 150 as company rankings 154. An example company ranking system 144 is illustrated in FIG. 2.

Figure 2:
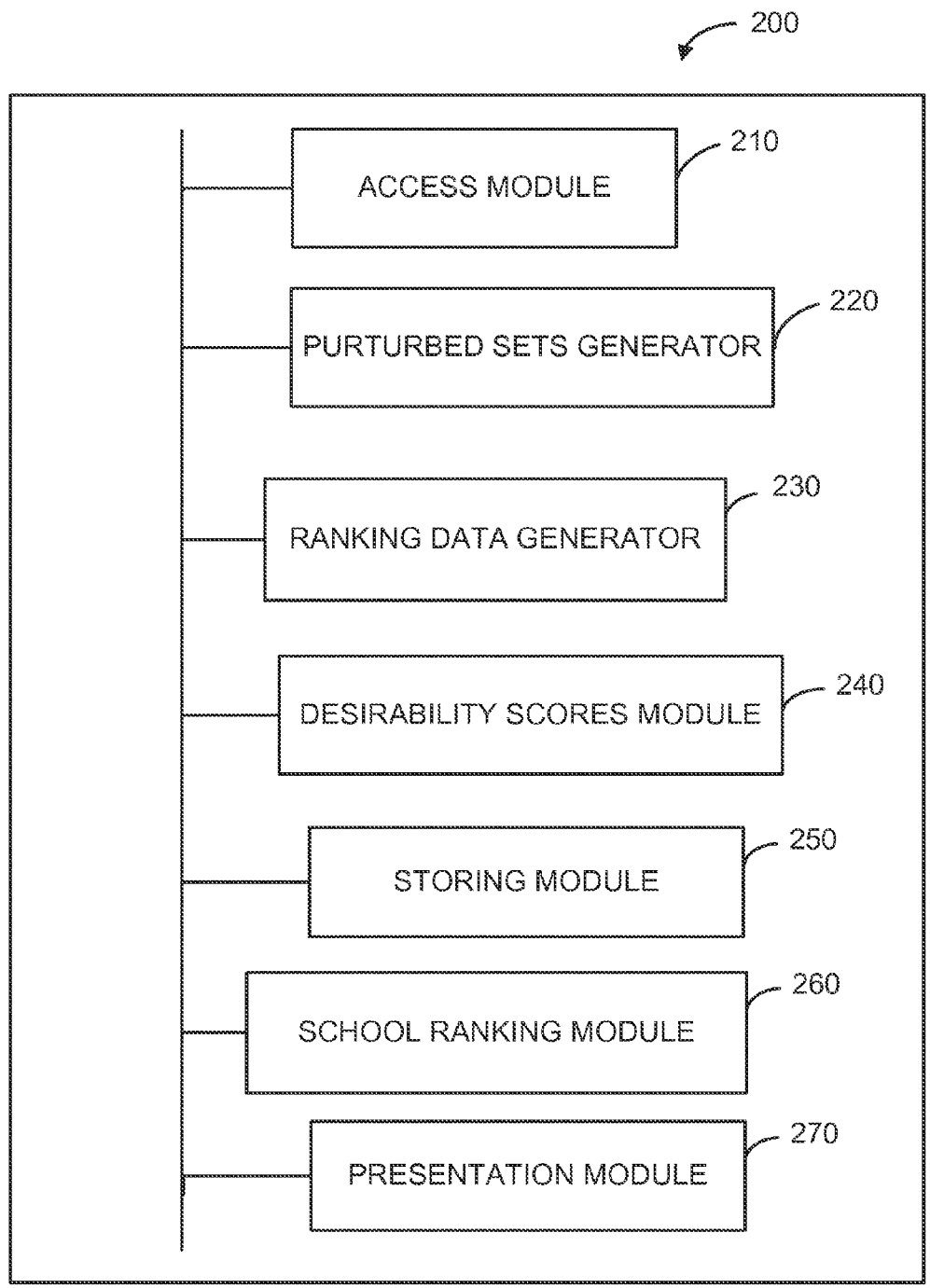
FIG. 2 is block diagram of a system to determine a desirability score for a company utilizing on-line social network data, in accordance with one example embodiment.

FIG. 2 is a block diagram of a system 200 to determine a desirability score for a company utilizing on-line social network data, in accordance with one example embodiment. As shown in FIG. 2, the system 200 includes an access module 210, a perturbed sets generator 220, a ranking data generator 230, and a desirability scores module 240. The access module 210 may be configured to access a base set of member profiles, where a member profile from the base set of member profiles represents a member of the on-line social network system 142 of FIG. 1. The profiles selected for inclusion in the base set of profiles may be associated with a particular target occupation, such as, e.g., finance, banking, etc. Based on the identifications of companies listed in the employment section of respective member profiles in the base set of member profiles, the system 200 may identify a set of subject companies that are to be evaluated with respect to their desirability in the field of target occupation.

The perturbed sets generator 220 may be configured to generate a plurality of perturbed sets by repeatedly bootstrap resampling the base set of member profiles. As described in more detail above, the perturbed sets generator 220 may be configured to randomly sample with replacement each profile from the base set of member profiles in order to produce a set in the plurality of perturbed sets of member profiles. The perturbed sets generator 220 may also be configured to preserve certain attribute-based characteristics of the base set of member profiles by partitioning the base set of member profiles based on respective values of an attribute of profiles in the base set of member profiles, independently bootstrap resampling each partition in the base set of member profiles to form partition samples, and then pooling together the partition samples to form the sample set. An attribute-based characteristic may include universities from which respective members obtained professional degrees, graduation years, gender, etc.

The ranking data generator 230 may be configured to generate ranking data for each company in a set of subject companies, based on the plurality of perturbed sets of member profiles. The ranking data may be in the form of node scores computed for a talent flow graph constructed using the base set of member profiles. The desirability scores module 240 may be configured to determine respective desirability scores for each company in the set of subject companies based on the ranking data for each company in the set of subject companies. Also shown in FIG. 2 is a storing module 250, which is configured to store, in the database 150 of FIG. 1, respective desirability scores for companies in a set of subject companies, as company rankings 154.

A school ranking module 260 is shown in FIG. 2 as part of the system 200, which may correspond, according to one example embodiment, to the company ranking system 144 of FIG. 1. It will be noted, that, in some embodiments, the school ranking module 260 may be configured to cooperate with the company ranking system 144 without being part of it. The school ranking module 260 may be configured to select a set of top-scoring companies from the set of companies based on their respective desirability scores and generate respective ranks for schools a set of subject schools with respect to the set of top-scoring companies. A presentation module 270 may be configured to cause presentation of ranks for school and/or company ranks on a display device. Some operations performed by the system 200 may be described with reference to FIG. 3.

Figure 3:
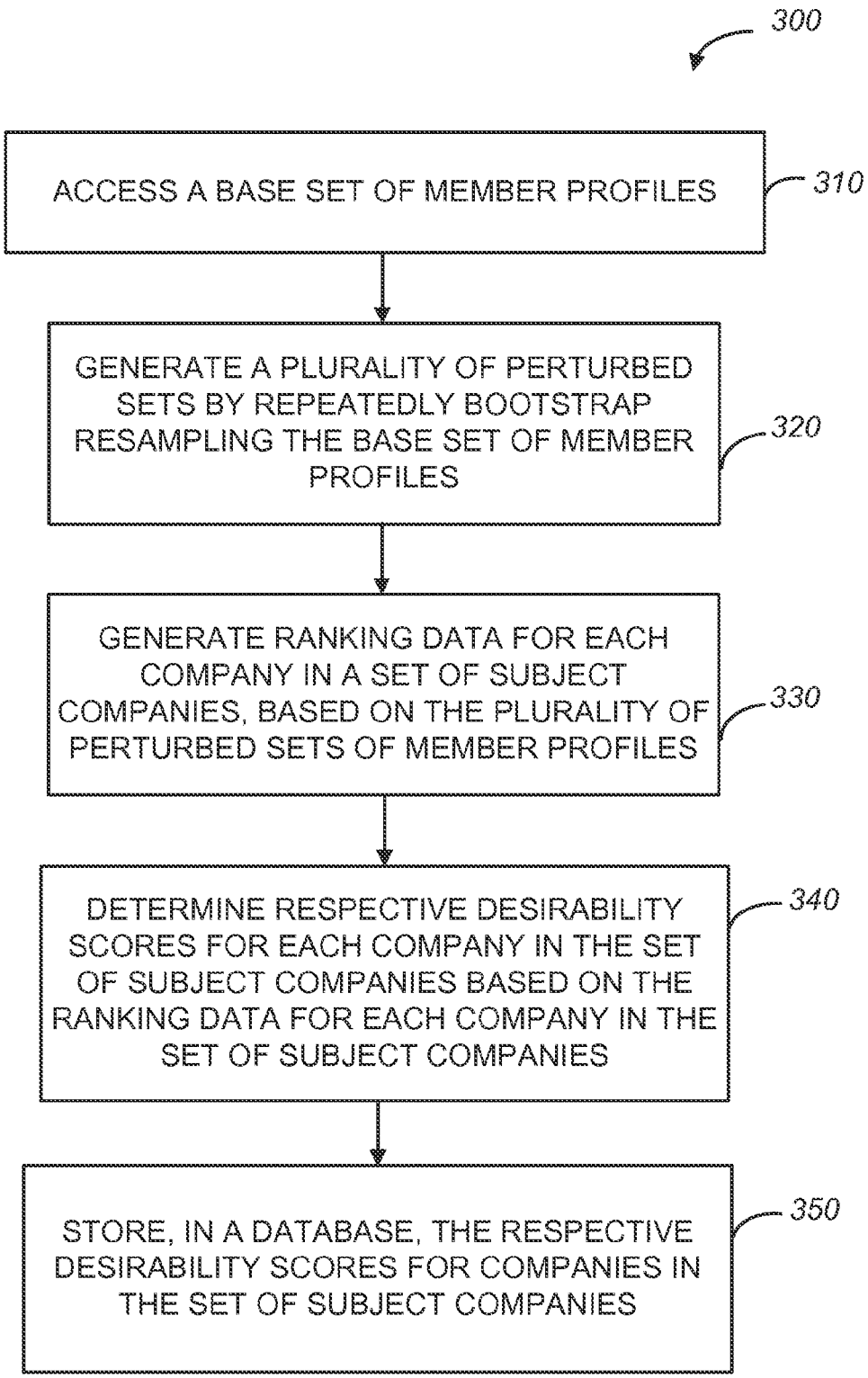
FIG. 3 is a flow chart of a method to determine a desirability score for a company utilizing on-line social network data, in accordance with an example embodiment.

FIG. 3 is a flow chart of a method 300 to determine a desirability score for a company utilizing on-line social network data to a social network member, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the access module 210 of FIG. 2 accesses a base set of member profiles at operation 310. As explained above, the profiles selected for inclusion in the base set of profiles may be associated with a particular target occupation. At operation 320, the perturbed sets generator 220 of FIG. 2 generates a plurality of perturbed sets by repeatedly bootstrap resampling the base set of member profiles. At operation 330, the ranking data generator 230 of FIG. 2 generates ranking data for each company in a set of subject companies, based on the plurality of perturbed sets of member profiles. The ranking data may be in the form of node scores computed for a talent flow graph constructed using the base set of member profiles. At operation 340, the desirability scores module 240 of FIG. 2 determines respective desirability scores for each company in the set of subject companies based on the ranking data. A storing module 250 of FIG. 2 stores respective desirability scores as company rankings 154 at operation 350.

Figure 4:
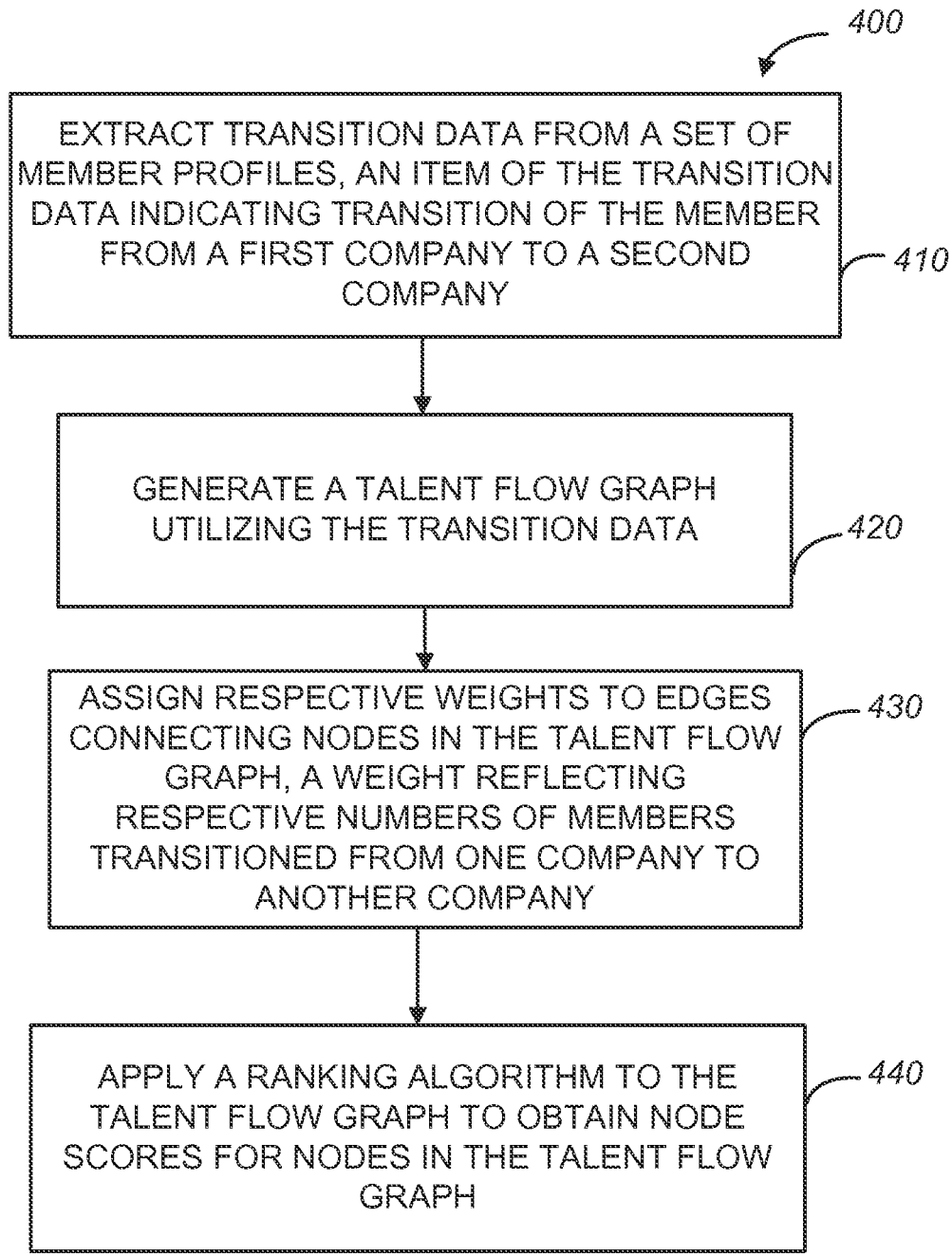
FIG. 4 is a flow chart of a method to determine node scores for nodes in a talent flow graph.

FIG. 4 is a flow chart of a method 400 to determine a desirability score for a company utilizing on-line social network data to a social network member, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 4, the method 400 commences at operation 410, when the transition data is extracted from a set of member profiles maintained by the on-line social network system 142 of FIG. 1. As explained above, an item of the transition data indicates transition of the member from a first company to a second company. At operation 420, a talent flow graph utilizing the transition data. The nodes in the talent flow graph represent respective companies from the set of companies and the edges connecting two nodes the talent flow graph indicate that one or more members transitioned from a first company represented by the first node to a second company represented by the second node. At operation 430, respective weights are calculated for edges connecting nodes in the talent flow graph. The weight of an edge may reflect a number of members transitioned from one company to another company. At operation 440, a ranking algorithm is applied to the talent flow graph to obtain node scores for nodes in the talent flow graph.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 5:
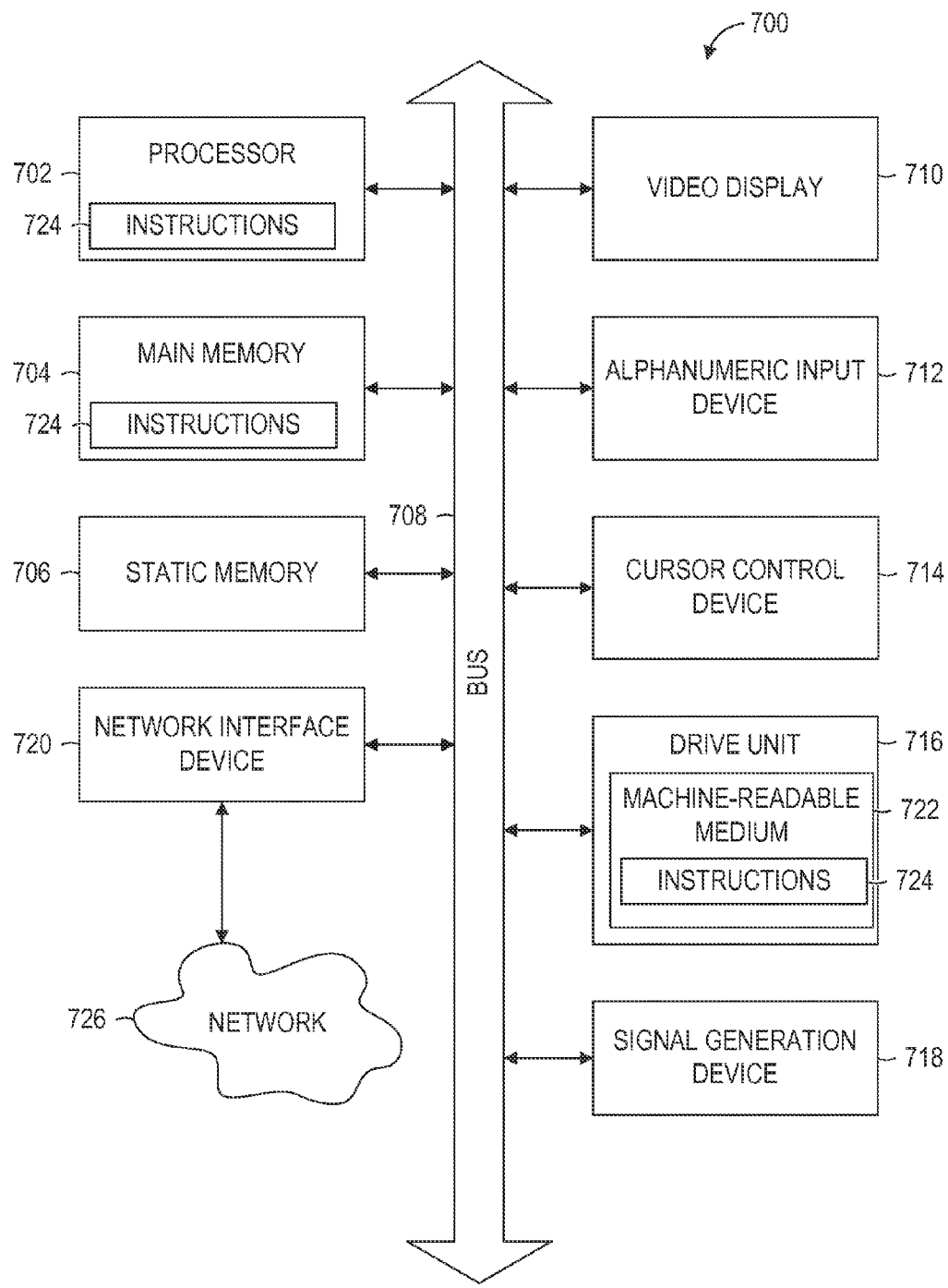
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to determine a company rank utilizing on-line social network data have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   accessing a base set of member profiles, a member profile from the base set of member profiles representing a member of an on-line social network system;
   using at least one processor, generating a plurality of perturbed sets by repeatedly bootstrap resampling the base set of member profiles;
   based on the plurality of perturbed sets of member profiles generating ranking data for each company in a set of subject companies;
   based on the ranking data for each company in the set of subject companies, determining respective desirability scores for each company in the set of subject companies; and
   storing, in a database, the respective desirability scores for companies in the set of subject companies,
   wherein the generating of the ranking data for each company in the set of subject companies comprises, for each sample set in the plurality of perturbed sets;
   extracting transition data from a sample set in the plurality of perturbed sets, an item of the transition data indicating transition from a first company to a second company of a member represented by a profile from the given set, the first company and the second company being from the set of subject companies,
   utilizing the transition data for generating a talent flow graph, nodes in the talent flow graph representing respective companies from the set of subject companies, an edge connecting a first node and a second node in the talent flow graph indicating that one or more members represented by respective profiles from the sample set transitioned from a first company represented by the first node to a second company represented by the second node,
   assigning a weight to the edge connecting the first node and the second node, the weight reflecting a number of members represented by respective profiles from the sample set who transitioned from the first company to the second company, and
   applying a ranking algorithm to the talent flow graph to obtain node scores for nodes in the talent flow graph, a node score for a certain node from the nodes in the talent flow graph indicating a likelihood that a member represented by a member profile in the on-line social network system transitions to a company represented by the certain node, the node score for the certain node included in ranking data for the company represented by the certain node.

2. The method of claim 1, wherein generating a perturbed set from the plurality of perturbed sets comprises randomly sampling with replacement each profile from the base set of member profiles.

3. The method of claim 1, wherein the plurality of perturbed sets comprises the base set of member profiles.

4. The method of claim 1, wherein each profile from the base set of profiles is associated with a target occupation.

5. The method of claim 1, wherein
   ranking data generated for a given company in the set of subject companies comprises node scores; and
   a desirability score for the given company is determined as a percentile below the median of the distribution of the ranking values.

6. The method of claim 1, wherein the generating of a sample set from the plurality of perturbed sets by repeatedly bootstrap resampling the base set of member profiles comprises:
partitioning the base set of member profiles based on respective values of an attribute of profiles in the base set of member profiles;
independently bootstrap resampling each partition in the base set of member profiles to form partition samples; and
pooling together the partition samples to form the sample set.

7. The method of claim 6, wherein the attribute comprises a graduation year.

8. The method of claim 1, comprising:
from the companies, based on their respective desirability scores, selecting a set of top-scoring companies; and
generating respective ranks for a set of subject schools with respect to the set of top-scoring companies.

9. The method of claim 8, comprising causing presentation, on a display device, of a rank from the respective ranks as associated with a target school from the set of subject schools.

10. A computer-implemented system comprising:
one or more processors, and
a non-transitory computer readable storage medium comprising instructions that when executed by the one or processors cause the one or more processors to perform operations comprising: accessing a base set of member profiles, a member profile from the base set of member profiles representing a member of an on-line social network system;
generating a plurality of perturbed sets by repeatedly bootstrap resampling the base set of member profiles;
a ranking data generator, implemented using at least one processor, to generate ranking data for each company in a set of subject companies, based on the plurality of perturbed sets of member profiles;
determining respective desirability scores for each company in the set of subject companies based on the ranking data for each company in the set of subject companies; and
storing, in a database, the respective desirability scores for companies in the set of subject companies, wherein the generating of the ranking data for each company in the set of subject companies comprises, for each sample set in the plurality of perturbed sets;
extracting transition data from a sample set in the plurality of perturbed sets, an item of the transition data indicating transition from a first company to a second company of a member represented by a profile from the given set, the first company and the second company being from the set of subject companies,
utilizing the transition data for generating a talent flow graph, nodes in the talent flow graph representing respective companies from the set of subject companies, an edge connecting a first node and a second node in the talent flow graph indicating that one or more members represented by respective profiles from the sample set transitioned from a first company represented by the first node to a second company represented by the second node,
assigning a weight to the edge connecting the first node and the second node, the weight reflecting a number of members represented by respective profiles from the sample set who transitioned from the first company to the second company, and
applying a ranking algorithm to the talent flow graph to obtain node scores for nodes in the talent flow graph, a node score for a certain node from the nodes in the talent flow graph indicating a likelihood that a member represented by a member profile in the on-line social network system transitions to a company represented by the certain node, the node score for the certain node included in ranking data for the company represented by the certain node.

11. The system of claim 10, comprising randomly sampling with replacement each profile from the base set of member profiles to produce a set in the plurality of perturbed sets of member profiles.

12. The system of claim 10, wherein the plurality of perturbed sets comprises the base set of member profiles.

13. The system of claim 10, wherein each profile from the base set of profiles is associated with a target occupation.

14. The system of claim 10, wherein
ranking data generated for a given company in the set of subject companies comprises node scores; and
the desirability scores module is to determine a desirability score for the given company as a percentile below the median of the distribution of the ranking values.

15. The system of claim 10, comprising
partitioning the base set of member profiles based on respective values of an attributed of profiles in the base set of member profiles;
independently bootstrap resampling each partition in the base set of member profiles to form partition samples; and
pooling together the partition samples to form the sample set.

16. The system of claim 15, wherein the attribute companies a graduation year.

17. The system of claim 10, comprising:
from the set of companies, based on their respective desirability scores, selecting a set of top-scoring companies; and
generating respective ranks for a set of subject schools with respect to the set of top-scoring companies.

18. A machine-readable non-transitory storage medium having instruction data executable by a machine to cause the machine to perform operations comprising:
accessing a base set of member profiles, a member profile from the base set of member profiles representing a member of an on-line social network system,
generating a plurality of perturbed sets by repeatedly bootstrap resampling the base set of member profiles;
based on the plurality of perturbed sets of member profiles generating ranking data for each company in a set of subject companies;
based on the ranking data for each company in the set of subject companies, determining respective desirability scores for each company in the set of subject companies; and
storing, in a database, the respective desirability scores for companies in the set of subject companies,
wherein the generating of the ranking data for each company in the set of subject companies comprises, for each sample set in the plurality of perturbed sets;
extracting transition data from a sample set in the plurality of perturbed sets, an item of the transition data indicating transition from a first company to a second company of a member represented by a profile from the given set, the first company and the second company being from the set of subject companies, utilizing the transition data for generating a talent flow graph, nodes in the talent flow graph representing respective companies from the set of subject companies, an edge connecting a first mode and a second node in the talent flow graph indicating that one or more members represented by respective profiles from the same set transitioned from a first company represented by the first node to a second company represented by the second node, assigning a weight to the edge connecting the first node and the second node, the weight reflecting a number of members represented by respective profiles from the sample set who transitioned from the first company to the second company, and applying a ranking algorithm to the talent flow graph to obtain node scores for nodes in the talent flow graph, a node score for a certain node from the nodes in the talent flow graph indicating a likelihood that a member represented by a member profile in the on-line social network system transitions to a company represented by the certain node, the node score for certain node included in ranking data for the company represented by the certain node.

\* \* \* \* \*

UNITED STATES PATENT AND TRADEMARK OFFICE
CERTIFICATE OF CORRECTION

PATENT NO. : 9,959,353 B2
APPLICATION NO. : 14/698730
DATED : May 1, 2018
INVENTOR(S) : Lytkin et al.

Page 1 of 1

It is certified that error appears in the above-identified patent and that said Letters Patent is hereby corrected as shown below:

In the Claims

In Column 15, Line 21, in Claim 18, after "for", insert --the--

Signed and Sealed this
Eleventh Day of June, 2019

Andrei Iancu
*Director of the United States Patent and Trademark Office*